(12) United States Patent
Kim et al.

(10) Patent No.: US 7,432,221 B2
(45) Date of Patent: Oct. 7, 2008

(54) ELECTROCATALYST FOR FUEL CELLS USING SUPPORT BODY RESISTANT TO CARBON MONOXIDE POISONING

(75) Inventors: Chang-Soo Kim, Inchon (KR); Young-Gi Kim, Taejon (KR); Wong-Yong Lee, Taejon (KR); Gu-Gon Park, Taejon (KR); Tae-Hyun Yang, Taejon (KR)

(73) Assignee: Korea Institute of Energy Research, Taejon (KR)

( * ) Notice: Subject to any disclaimer, the term of this patent is extended or adjusted under 35 U.S.C. 154(b) by 222 days.

(21) Appl. No.: 10/453,136

(22) Filed: Jun. 3, 2003

(65) Prior Publication Data

US 2004/0248730 A1 Dec. 9, 2004

(51) Int. Cl.
*B01J 23/00* (2006.01)
*B01J 23/40* (2006.01)
*B01J 21/18* (2006.01)

(52) U.S. Cl. .................. 502/185; 502/101; 502/180; 502/182

(58) Field of Classification Search .............. 502/101, 502/180, 182, 185
See application file for complete search history.

(56) References Cited

U.S. PATENT DOCUMENTS

| | | | | |
|---|---|---|---|---|
| 4,876,115 | A * | 10/1989 | Raistrick | 427/115 |
| 5,372,981 | A * | 12/1994 | Witherspoon | 502/155 |
| 6,099,960 | A * | 8/2000 | Tennent et al. | 428/367 |
| 6,099,965 | A * | 8/2000 | Tennent et al. | 428/408 |
| 6,261,632 | B1 * | 7/2001 | Andolfatto et al. | 427/113 |
| 6,277,513 | B1 * | 8/2001 | Swathirajan et al. | 429/44 |
| 6,515,845 | B1 * | 2/2003 | Oh et al. | 361/502 |
| 2002/0187896 | A1 * | 12/2002 | Ryoo et al. | 502/418 |
| 2003/0180215 | A1 * | 9/2003 | Niu et al. | 423/651 |

OTHER PUBLICATIONS

Fuertes et al., control of mesoporous structure of carbons synthesised using a mesostructured silica as template, Microporous and Mesoporous Materials 62, pp. 177-190 (2003).*
Qi et al., Effect of CO in the anode fuel on the performance of PEM fuel cell cathode, Journal of Power Sources 4880, pp. 1-9 (2002).*
http://www.etek-inc.com/faq.html.*
T. Ioroi, N. Fujiwara, Z. Siroma, K. Yasuda, Y. Miyazaki; "*Platinum and Molybdenum Oxide Deposited Carbon Electrocatalyst for Oxidation of Hydrogen Containing Carbon Monoxide*"; Electrochemistry Communications 4 (2002), pp. 442-446.
Z. Qi, C. He, A. Kaufman; "*Effect of CO in the Anode Fuel on the Performance of PEM Fuel Cell Cathode*"; Journal of Power Sources, 4880 (2002), pp. 1-9.

* cited by examiner

*Primary Examiner*—Elizabeth D Wood
(74) *Attorney, Agent, or Firm*—DeLio & Peterson, LLC; Peter W. Peterson

(57) ABSTRACT

Disclosed is an electrocatalyst for fuel cells, in which a porous carbon material including pores having a diameter smaller than a kinetic diameter of carbon monoxide is used as a support body and contact probability between an activated metal and carbon monoxide is decreased, thereby preventing fuel cell performance from being degraded by carbon monoxide. The electrocatalyst is obtained by adsorbing 10-80 parts by weight of an activated metal to 20-90 parts by weight of a porous support body, characterized in that the porous support body has a total surface area of 200-2,500 $m^2/g$ including an outer surface thereof and an inner surface of pores thereof, and has a plurality of pores penetrating into an interior of the support body with an average diameter of 2-15 nm and a total volume of 0.4-2.0 $m^3/g$, and the activated metal is alloyed with 20-95 at % of platinum and 5-80 at % of one metal selected from among Ru, Sn, Os, Rh, Ir, Pd, V, Cr, Co, Ni, Fe and Mn. As for such an electrocatalyst, carbon monoxide does not fundamentally come in contact with the activated metal adsorbed to the inner surface of the pores of the support body, thereby minimizing degradation of fuel cell performance, thus overcoming fuel-feeding problems.

12 Claims, 2 Drawing Sheets

ELECTROCATALYST FOR FUEL CELLS USING SUPPORT BODY RESISTANT TO CARBON MONOXIDE POISONING

BACKGROUND OF THE INVENTION

1. Field of the Invention

The present invention relates to, in general, electrocatalysts for fuel cells using support bodies resistant to carbon monoxide poisoning. More specifically, the present invention is directed to an electrocatalyst for fuel cells comprising activated metal particles acting as a catalyst and a support body for adsorbing such catalyst particles, characterized by using a porous carbon material as a support body, instead of conventionally used carbon black, in which such a carbon support body can be further adsorbed with an activated metal and has pores penetrating into an interior thereof with a diameter smaller than a kinetic diameter of carbon monoxide, whereby carbon monoxide inevitably produced upon reforming hydrocarbon fuels is prevented from coming into contact with the activated metal adsorbed to the inner surface of each pore of the support body, and deactivation of the activated metal due to adsorption of carbon monoxide is restrained, therefore resulting in preventing degradation of fuel cell performance by carbon monoxide.

2. Description of the Prior Art

In general, fuel cells function to directly convert chemical energy produced by oxidation of fuels to electrical energy. Such a fuel cell has the same function as typical chemical cells in view of using oxidation and reduction reactions. However, different from chemical cells using cell reaction in a closed system, the fuel cell acts as a certain electric power generator while a reactant is continuously fed from the outside and a reaction product is continuously discharged to the outside.

As for the fuel cell, hydrogen in hydrocarbon fuels, such as methanol or natural gas, is electrochemically reacted with oxygen in air to immediately generate electrical energy. That is, the fuel cell serves as a clean electric power generator having high efficiency. Since development of fuel cells for use in spacecraft or for military purposes in USA in the 1970s, intensive research into such fuel cells for use as general power sources has been ongoing. At present, research and development of practical fuel cells have been actively carried out in developed countries, such as USA, Japan and Europe.

Meanwhile, the fuel cell is classified into alkaline-, phosphoric acid-, molten carbonate-, solid oxide- and polymer electrolyte membrane-types, depending on the used electrolytes. Further, the cell having operating temperatures of 300° C. or less is referred to as a low-temperature type, while the cell having operating temperatures of 300° C. or more is referred to as a high-temperature type.

Reaction of hydrogen and oxygen, which are fuel of the fuel cell, at an electrode leads to production of water and electricity. As such, oxygen contained in air may be used as it is, whereas hydrogen may be used after being extracted from a separate storage container containing hydrogen in an amount necessary for the fuel cell.

However, since hydrogen is difficult and dangerous to handle because of its volatility, hydrocarbon fuels including methanol, LNG, gasoline, etc., are reformed to hydrogen, which is generally used for the fuel cell.

When hydrogen reformed from the hydrocarbon fuel is used, it is advantageous in terms of stability, storability and convenience, compared to direct use of hydrogen as a fuel, but has the following drawbacks.

In the course of reforming the hydrocarbon fuel, carbon monoxide and carbon dioxide are inevitably generated along with hydrogen. Such carbon monoxide is strongly adsorbed to a surface of platinum used as a catalyst of the electrochemical reaction, thus drastically degrading the fuel cell's performance.

Therefore, in order to efficiently use the hydrocarbon fuel which is relatively easy to handle, instead of directly using hydrogen which is difficult to handle, degradation of the fuel cell performance by carbon monoxide, which is produced with hydrogen upon reforming the hydrocarbon fuel, should be restrained as much as possible. For this, there are proposed methods of alloying the platinum catalyst with a second metal.

FIG. 1 shows a conventional catalyst structure. As shown in FIG. 1, carbon black is used as a support body 12, on which small particles of an activated metal 11 are bonded as a catalyst. Such a catalyst structure is completely exposed to a fuel gas. Hence, with the intention of decreasing adsorption energy between carbon monoxide and the surface of activated metal exposed to the fuel gas, platinum as the activated metal is not used alone but used in an alloyed state.

The second metal, which is alloyed to platinum to decrease adsorption energy with carbon monoxide, can be one of various types of metals. As a commercially available catalyst, there is widely used a Pt—Ru/C catalyst using ruthenium as the second alloying metal.

The ruthenium-added alloy catalyst has resistance to carbon monoxide poisoning according to the following Chemical Reaction 1:

$$Ru + H_2O = Ru\text{—}OH + H^+ + e^-$$

$$Pt\text{—}CO + Ru\text{—}OH = CO_2 + H^+ + e^- + Pt + Ru \quad \text{Chemical Reaction 1}$$

According to the above chemical reaction, two methods for preventing adsorption of carbon monoxide to the platinum catalyst are employed. That is, one of the two is to decrease bonding energy between platinum and carbon monoxide, and the other is to effectively oxidize carbon monoxide.

However, in spite of the above two effects, degradation of the fuel cell performance by carbon monoxide cannot be completely prevented yet. Only when concentration of carbon monoxide is 10 ppm or less, fuel cell performance is satisfactorily maintained. As the concentration of carbon monoxide gradually increases over 10 ppm, the fuel cell performance is degraded. In particular, at 100 ppm carbon monoxide, the fuel cell performance is considerably degraded.

As mentioned above, hydrogen gas produced by reforming the hydrocarbon fuel contains essentially carbon monoxide, carbon dioxide, water and unreacted fuel. Of these components, carbon monoxide is the most problematic component. Therefore, in order to prevent degradation of the electrode performance by such carbon monoxide, a variety of methods have been proposed. Such methods are largely divided into two kinds as described below.

First, there is employed a method of using a metal alloy. As an alloyed platinum catalyst, use is made of PtRu, PtSn, PtOs, PtRh, PtIr, PtPd, PtV, PtCr, PtCo, PtNi, PtFe, PtMn, PtCoMo, PtWO$_3$, PtCoWO$_3$, etc. However, recently reported studies disclose no alloying methods capable of completely preventing degradation of the cell performance by carbon monoxide.

According to recent literature, in the presence of 100 ppm carbon monoxide in the reformed gas, the fuel cell shows a voltage drop of 150-200 mV at a certain current density (200 mA/cm$^2$). Further, upon use of commercially available catalysts from Johnson-Matthey, E-TEK and Tanaka Co. Ltd., the voltage drop of fuel cells is reported to be similar to the 150-200 mV as stated above, or worse.

Second, there is employed an air-bleeding method, with the intention of solving poisoning problems of the platinum catalyst by carbon monoxide. Carbon monoxide adsorbed to the platinum catalyst is eliminated while air as an external oxygen source is supplied slowly. As such, when a reformed gas and air are slowly supplied to a certain electrode showing performance degradation, such an electrode is recovered.

However, the above method is effective only for a short-term period. In addition, since the reaction per se is highly exothermic, a platinum metal is agglomerated and does not function as a catalyst. In the case of the polymer electrolyte membrane fuel cell, a polymer membrane used as an electrolyte is easily punctured, thus decreasing durability of the cell.

SUMMARY OF THE INVENTION

Leading to the present invention, the intensive and thorough research into electrocatalysts for fuel cells to improve performance degradation by carbon monoxide, which is produced with hydrogen upon reforming hydrocarbon fuel, carried out by the present inventors aiming to solve the problems encountered in the prior arts, such as limitations to reduction of adsorption energy between an activated metal and carbon monoxide achieved by alloying the activated metal with a second metal, led to development of an electrocatalyst for fuel cells which minimizes contact between carbon monoxide acting as a cause of poisoning and an activated metal by use of a porous support body, in which the support body constituting the electrocatalyst includes pores penetrating into an interior thereof with a diameter smaller than a kinetic diameter of a carbon monoxide molecule, whereby carbon monoxide is not brought into contact with the activated metal adsorbed to an inner surface of the pores of the support body, thus preventing deactivation of the activated metal by carbon monoxide.

Therefore, it is an object of the present invention to provide an electrocatalyst for fuel cells by use of a porous support body.

DETAILED DESCRIPTION OF THE INVENTION

The above object of the present invention is achieved by a porous structure of a support body.

Based on the present invention, an electrocatalyst for fuel cells by use of the support body resistant to carbon monoxide poisoning comprises a granular support body consisting mainly of carbon and an activated metal adsorbed to the support body, characterized in that the support body on which particles of the activated metal are adsorbed as a catalyst is formed with a plurality of pores penetrating into an interior thereof to obtain a porous structure of the support body.

Figure 1:
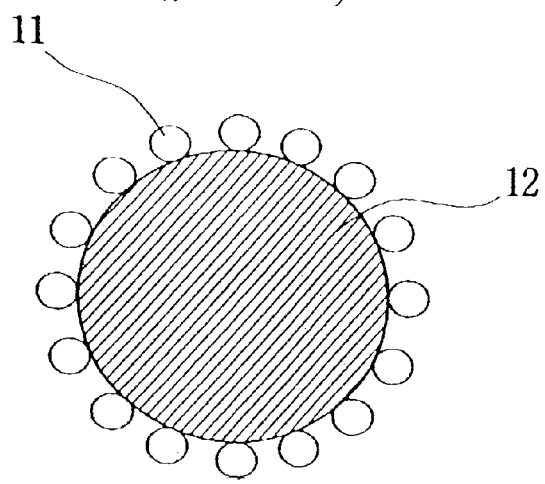
FIG. 1 is a cross-sectional view showing a structure of a conventional catalyst.
Figure 2:
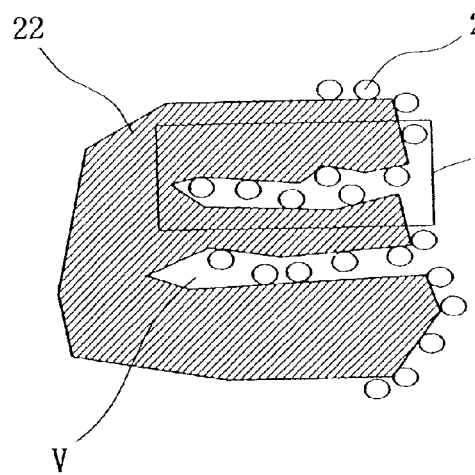
FIG. 2 is a cross-sectional view showing a structure of an electrocatalyst of the present invention adsorbed with an activated metal, resistant to carbon monoxide poisoning.
Figure 2A:
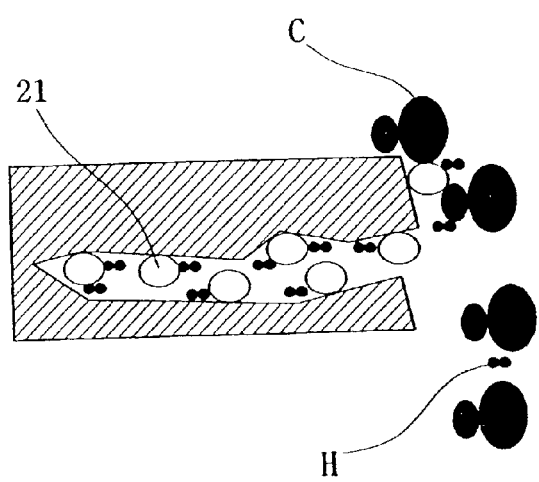
FIG. 2A is a cross-sectional enlarged view of the boxed portion of the electrocatalyst of FIG. 2 adsorbed with an activated metal, resistant to carbon monoxide poisoning.

As shown in FIGS. 2 and 2A, a support body 22 for use in an electrocatalyst of the present invention has pores 'V' penetrating into an interior thereof, to form a porous support body. Hydrogen 'H' may be introduced into the pores 'V', whereas carbon monoxide 'C' may not be introduced into the pores 'V'. Thereby, particles of activated metal 21 adsorbed and dispersed into the pores 'V' do not come in contact with carbon monoxide, thus maintaining activity of the activated metal. Consequently, degradation of fuel cell performance by carbon monoxide is restrained.

Therefore, as for the porous support body, a diameter of each pore entrance formed in an outer surface of the support body is a more important factor than a depth of the pores penetrating into the interior of the support body.

Before the electrocatalyst is described, it is to be understood that the terms 'pore' formed in the support body and 'surface' of the support body used herein are defined as follows.

The 'pore' of the present invention means not isolated from the exterior after gas is captured in a support body, but extends into an interior of the support body from an outer surface thereof. In other words, a groove or cave shape penetrated into the interior of the support body is referred to as the 'pore' of the present invention.

A surface of the support body without a plurality of the pores is referred to as 'outer surface', and a surface of the pores penetrating into the interior of the support body is defined as the 'inner surface'. Further, the outer surface of the support body and the inner surface of the pore are together called 'total surface'.

The electrocatalyst of the present invention is prepared by adsorbing a precursor of the activated metal to the porous support body and reducing the adsorbed activated metal. The surface of activated metal as the catalyst is further adsorbed with nafion polymer, through which the activated metal particles are connected to each other and used as an electrode of the fuel cell. Through preparation of such an electrocatalyst and adsorption of the polymer, the activated metal particles are deposited onto the inner surface of the firstly formed pores to the support body and the polymer functions to connect the activated metal particles. Thereby, upon operation of the fuel cell, the final pore size formed in the electrocatalyst coming into contact with the fuel gas becomes small.

Thus, in consideration of decrease of the pore size, the pores firstly formed in the support body should be made to be larger than the pores finally formed thereto.

That is, as for the electrocatalyst of the present invention, hydrogen may be introduced into the final pores having adsorbed polymer therein and coming into contact with fuel gas, whereas carbon monoxide should be prevented from being introduced thereinto. In order to introduce hydrogen into the final pores, the pore size should be larger than 2.8 Å (1 Å=$10^{-10}$ m) which is a kinetic diameter of hydrogen molecule. In addition, with the aim of preventing introduction of carbon monoxide into the pores, the pore size should be smaller than 3.8 Å, which is a kinetic diameter of carbon monoxide.

As for the pore formed finally to the electrocatalyst having the adsorbed polymer, a diameter of an entrance of each pore formed in the outer surface of the support body is preferably in the range of from 2.8 Å to less than 3.8 Å. Thereby, carbon monoxide, which poisons the activated metal, does not come into contact with the activated metal adsorbed to the inner surface of the pores. Thus, carbon monoxide has no influence on the activated metal. Further, since hydrogen gas molecules as a fuel material of the fuel cell may sufficiently contact the entire activated metal present in the pores, overall performance of the catalyst is constantly maintained.

However, upon preparation of the electrocatalyst using the porous support body, the pores formed in the support body are decreased in size due to adsorption and reduction of the activated metal and adsorption of the polymer. Thus, taking account of decrease of the size of the pores, the support body before acting as the electrocatalyst should have a larger pore diameter, compared to the final pores formed in the support body serving as the electrocatalyst having the adsorbed polymer. Most preferably, the first pores formed in the support body have an average diameter in the range of 2 to 15 nm (1 nm=$10^{-9}$ m).

When the average diameter of the pores formed in the support body is less than 2 nm, a large percentage of the final pores formed in the electrocatalyst after the polymer is adsorbed become smaller than 2.8 Å in diameter. If so, neither carbon monoxide nor hydrogen can be introduced into such pores, and electrochemical reaction efficiency is lowered, therefore resulting in degradation of the fuel cell performance. On the other hand, if the diameter exceeds 15 nm, a large percentage of the final pores have a diameter larger than 3.8 Å, thus allowing carbon monoxide to contact the activated metal within the pores, leading to deactivation of the activated metal by adsorption of carbon monoxide.

The diameter of the pores formed in the support body is an average value. When the pores of the support body have a specific average diameter, the diameter of the total pores also have a specific diameter range. Specifically, the pores are classified into micropores less than 2 nm in diameter, mesopores ranging from 2 to 50 nm and macropores exceeding 50 nm.

Of the above pores, the micropore-modified final pores are too small, and hydrogen cannot be introduced thereinto. Meanwhile, the macropore-modified final pores are too large, and carbon monoxide can be freely introduced and adsorbed to the activated metal catalyst. Therefore, the mesopores are most effective. However, if the average diameter of the mesopores exceeds 15 nm, carbon monoxide may be freely introduced into the mesopores, as in the macropores. Thus, it is most preferable that the pores have the average diameter ranging from 2 to 15 nm, which is close to the lower limit of the diameter range of the mesopores.

When the average diameter of the mesopores formed in the support body is 2 nm, pores having a diameter less than 2 nm may be inevitably formed. The larger the average diameter, the lower the fraction of pores which are too small. When the pores are formed within the average diameter range, mesopores and micropores among the total pores constitute 50-80 vol % and 20-50 vol %, respectively. The macropores are hardly formed.

In such a case, with the intention of further increasing the fraction of the mesopores, if the average diameter of the pores is larger than 15 nm, the fraction of micropores decreases while the fraction of mesopores increases. However, such mesopores may not exclude carbon monoxide therefrom, as in the macropores.

The porous support body comprising the above average diameter of pores is suitable for use in the electrocatalyst of the present invention, and has a total surface area of 200-2,500 m$^2$/g, and a total pore volume of 0.4-2.0 m$^3$/g.

The electrocatalyst prepared by use of the porous support body formed with the pores having an average diameter range of 2-15 nm includes a Pt-M/PS structure, in which M is a second metal suitable for use in alloying platinum and is selected from the group consisting of Ru, Sn, Os, Rh, Ir, Pd, V, Cr, Co, Ni, Fe, Mn, Mo, W, etc. Herein, the PS means a support body having porosity.

The alloy catalyst Pt-M as the activated metal in the electrocatalyst contains 5-80 at % of the second metal, and the alloy catalyst is used in an amount of 10-80 wt %, based on the total weight of the electrocatalyst comprising the support body and the activated metal as the alloy catalyst.

In the alloy catalyst Pt-M, the amount of the second metal as the alloying element of platinum falls in a generally used range. When a conventional support body without pores is used, an alloy catalyst is used in the amount of 10-60 wt % based on the total weight of an electrocatalyst. However, use of the porous support body in the present invention results in increase of the total surface area of the support body, thus raising the weight ratio of the alloy catalyst to the support body. In the present invention, the alloy catalyst is used in the amount 10-80 wt %, based on the total weight of the electrocatalyst.

If the particles of the alloy catalyst adsorbed and dispersed to the outer surface of the support body and the inner surface of the pores contribute less than 10 wt % based on the total weight of the catalyst, an absolute amount of active catalytic sites required for electrochemical reactions of the fuel cells is deficient, therefore resulting in decreasing output of the fuel cell. Meanwhile, if the alloy catalyst exceeds 80 wt %, the particles of the alloy catalyst having a diameter of 2-3 nm required for optimal reaction are difficult to uniformly disperse, whereby the particles are massed and decreased in activity, thus degrading the fuel cell performance.

Accordingly, in the electrochemical reaction of the fuel cell, the particle size of the alloy catalyst is regarded as a very important factor. The particle size necessary for optimal reaction is known to be 2-3 nm. It is preferable that such catalyst particles adsorbed to the support body are uniformly dispersed while the particles are stacked or come into contact with each other, so that the resultant size of the catalyst particles does not exceed the above range.

As mentioned above, the electrocatalyst of the present invention is prepared by adsorbing the alloy catalyst to the porous support body and reducing the adsorbed alloy catalyst, in which the porous support body is made of carbon. Further, as for the support body, a carbon-containing material is carbonized, which is exemplified by wood, inner coat of palm, brown coal, bituminous coal, coal pitch, petroleum pitch and the like. Then, the carbonized material is mixed with $ZnCl_2$, NaOH, KOH, $H_3PO_4$, and exposed to water vapor, hydrogen, argon, helium, carbon monoxide, carbon dioxide and so on at high temperatures, thereby obtaining porous carbon particles composed mainly of micropores.

The porous carbon particles comprising the micropores are exemplified by commercially available activated carbon. Such carbon particles having micropores are subjected to retreatment process such as heating, thus preparing the support body used in the present invention.

Performance of the electrocatalyst of the present invention, by use of the porous support body, is specifically described in the following examples.

Having generally described this invention, a further understanding can be obtained by reference to certain specific examples which are provided herein for purposes of illustration only and are not intended to be limiting unless otherwise specified.

EXAMPLE

As a basic material of a porous support body useful in the present invention, commercially available activated carbon was used. Under nitrogen gas atmosphere, the activated carbon was heated to various temperatures, such as 600, 700, 800 and 900° C., and kept for 2 hours.

As such, heating of the activated carbon to high temperatures resulted in enlargement of micropores formed in the activated carbon to mesopores, to prepare support bodies used in the present invention.

The support bodies heated to the above temperatures for a predetermined time period were cooled at room temperature. The cooled support bodies were washed with a solution of hydrochloric acid and washed several times with distilled water. The washed support bodies were dried in an oven at 120° C. for 15 hours.

Physical properties of the porous support bodies thus prepared are shown in Table 1, below.

TABLE 1

| sample | $S_{BET}$ [m²/g] | $S_{mi}$ [m²/g] | $S_{me}$ [m²/g] | $V_{mi}$ [m³/g] | $V_{tot}$ [m³/g] | $V_{me}$ [m³/g] | D [nm] | $V_{me}/V_{tot}$ [%] |
|---|---|---|---|---|---|---|---|---|
| 1 | 1720 | 1495 | 225 | 0.634 | 1.342 | 0.708 | 3.57 | 52 |
| 2 | 2204 | 1661 | 543 | 0.700 | 1.954 | 1.254 | 3.69 | 64 |
| 3 | 1121 | 795 | 326 | 0.334 | 1.264 | 0.930 | 4.46 | 73 |
| 4 | 251 | 197 | 54 | 0.081 | 0.459 | 0.378 | 8.42 | 82 |

In the above table 1, $S_{BET}$ represents a total surface area of BET, and $S_{mi}$ represents an inner surface area of micropores, and $S_{me}$ represents an inner surface area of mesopores. In addition, $V_{mi}$ represents a volume of the micropores and $V_{me}$ represents a volume of the mesopores. Further, D represents an average diameter of the pores, and $V_{me}/V_{tot}$ represents a volume ratio of the mesopores to the total pores.

From the above table 1, it can be seen that four samples of the support body have an average diameter ranging from 3 to 9 nm, meeting a pore size limit. As for vol % of the mesopores, compared to the total pores, the other support bodies satisfy a porous structure of the support body needed for the electrocatalyst of the present invention, except for sample No. 4, which deviates from 2%.

In addition, as the heating temperature increases, the pore size formed finally becomes large while the micropores of the activated carbon are enlarged.

Of the above porous support bodies, Nos. 1, 2 and 4 support bodies are adsorbed with $H_2PtCl_6 \cdot H_2O$ and $RuCl_3 \cdot xH_2O$ as a precursor of activated metal, which are reduced to three types of catalytic metals represented by Pt—Ru/PSn(n: sample number). Physical properties of each catalytic metal are shown in Table 2, below.

TABLE 2

| Sample | $S_{BET}$ [m²/g] | $S_{mi}$ [m²/g] | $S_{me}$ [m²/g] | $V_{mi}$ [m³/g] | $V_{tot}$ [m³/g] | $V_{me}$ [m³/g] | D [nm] | $D_P$ [nm] |
|---|---|---|---|---|---|---|---|---|
| Pt—Ru/PS1 | 777 | 551 | 226 | 0.280 | 0.758 | 0.478 | 4.3 | 3.45 |
| Pt—Ru/PS2 | 1283 | 975 | 308 | 0.574 | 1.144 | 0.570 | 3.8 | 1.07 |
| Pt—Ru/PS3 | 111 | 27 | 84 | 0.0119 | 0.380 | 0.368 | 35.9 | 2.78 |

In the above table 2, $D_P$ represents a size of platinum crystal, and $S_{BET}$ represents a BET surface area of the electrocatalyst.

From the above tables 1 and 2, it can be seen that the pores firstly formed in the support body are changed in inner surface area and size, with adsorption and reduction of the activated metal to the support body. The activated metal particles adsorbed to an outer surface of the support body may act to plug entrances of a plurality of the micropores formed in the support body, thereby decreasing the content of the activated metal adsorbed to an inner surface of each pore of the support body. However, it is believed that three electrocatalyst samples have sufficient activity, within the above ranges of the total surface area of the support body and the particle size of the activated metal.

In order to investigate electrocatalytic performance of the present invention, a membrane-electrode assembly (MEA) is fabricated using the electrocatalysts of the present example, to form each unit cell. A reactive area of the electrode used to evaluate unit cell performance is 50 cm², and fuel utilization ratio in the cell is set to 80% hydrogen and 40% oxygen.

Each electrode is maintained at 70° C. under 100% humidity. All performance evaluations were performed under atmospheric pressure. The performances of the electrocatalyst samples of the present invention were compared with that of commercially available catalyst, and the results are shown in FIGS. 3 and 4.

Figure 3:
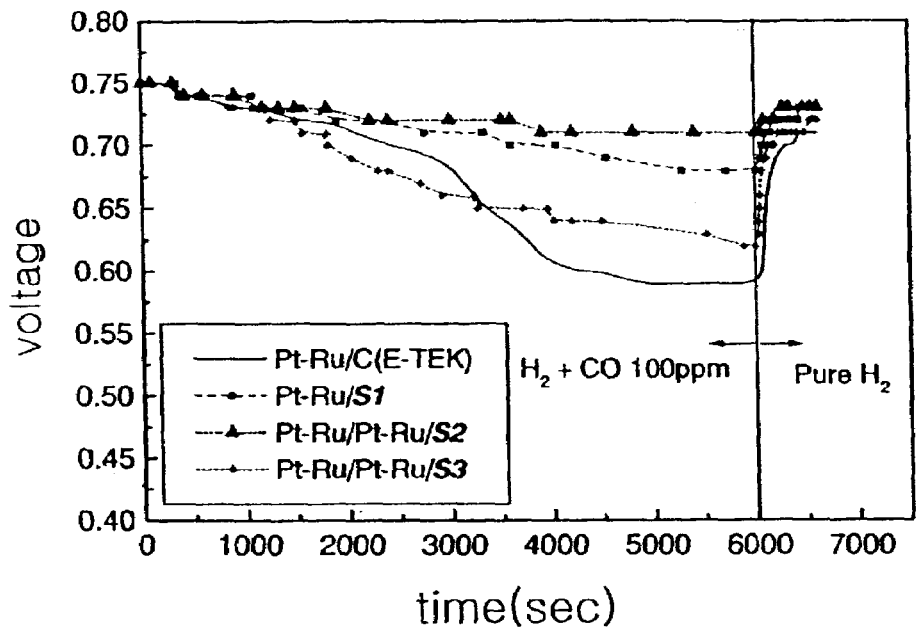
FIG. 3 is a graph showing voltage change of fuel cells using a commercially available catalyst and catalysts of the present invention with time when 100 ppm carbon monoxide is contained in hydrogen.
Figure 4:
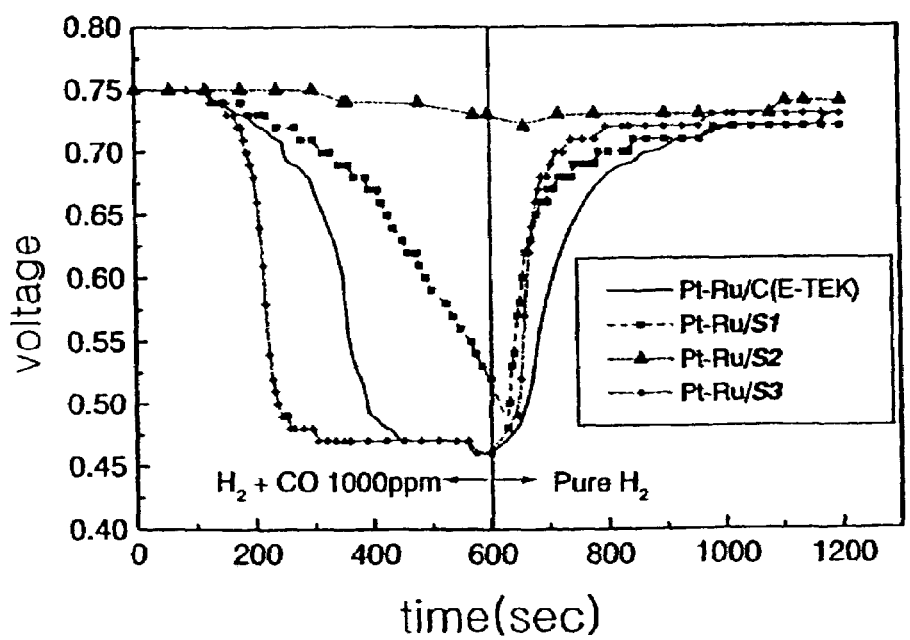
FIG. 4 is a graph showing voltage change of fuel cells using a commercially available catalyst and catalysts of the present invention with time when 1000 ppm carbon monoxide is contained in hydrogen.

With reference to FIG. 3, there are shown not only changes of voltage occurring over 100 min while a gas comprising 100 ppm carbon monoxide in hydrogen flows to a fuel electrode, but also restoration of the electrode performance while pure hydrogen is further supplied thereto. As shown in FIG. 3, performance degradation of commercially available catalyst provided from E-TEK Co. Ltd., and the inventive catalysts by carbon monoxide are compared.

As for the commercially available catalyst, voltage was decreased by 120 mV over an operating time of 100 min. Meanwhile, the voltage drop of the inventive catalysts was smaller than 120 mV. In particular, voltage drop of Pt—Ru/PS2 catalyst was less than 20 mV under the same conditions as the other catalysts.

Recent articles related to durability of catalysts against carbon monoxide under similar conditions to the above evaluation conditions report voltage drops of about 150-200 mV [T. Ioroi et al, Electrochem. Com., 4, 442 (2002), Z. Qi et al, J. Power Sources, 4880, 1 (2002)]. Therefore, such voltage drop of 20 mV in the inventive catalyst under 100 ppm carbon monoxide is the highest durability against carbon monoxide.

In addition, upon feeding pure hydrogen, performance of the inventive catalysts is more rapidly restored than that of the commercially available catalyst.

Turning now to FIG. 4, there are shown not only changes of voltage occurring over 10 min while a gas comprising 1000 ppm carbon monoxide in hydrogen flows to a fuel electrode, but also restoration of the electrode performance while pure hydrogen is further supplied thereto. As shown in FIG. 4, the commercially available catalyst provided from E-TEK Co. Ltd. and the inventive catalysts are compared in performance degradation by carbon monoxide.

Similar to FIG. 3, voltage of the commercial catalyst and Pt—Ru/PS1 as the inventive catalyst decline drastically by about 300 mV over an operating time of 10 min. On the other hand, the voltage drop of another inventive catalyst Pt—Ru/PS2 is less than 20 mV.

Since it is difficult to confirm other evaluation data for durability of the catalyst against carbon monoxide under the condition of 1000 ppm carbon monoxide, the example result of the present invention cannot be directly compared to other technologies. However, it is noted that the inventive catalyst Pt—Ru/PS2 has excellent durability against carbon monoxide, and is faster in performance restoration effect than the others, in the presence of pure hydrogen fuel.

As described above, the electrocatalyst for fuel cells of the present invention functions to prevent carbon monoxide from coming into contact with an activated metal, thus preventing fuel cell performance from being degraded by carbon monoxide. Thereby, fuel feeding problems are overcome.

That is, since fuel cells formed of the inventive electrocatalyst are not severely degraded even in the presence of 1000 ppm carbon monoxide, the concentration of carbon monoxide need not be controlled to 10 ppm to be suitable for use in the fuel cells. Thus, a reformer useful in reforming hydrocarbon fuel can be manufactured to small size and simple structure, whereby fuel cells can be manufactured at low cost. Upon unstable operation of the reformer, even though CO concentration is drastically changed, electric power can be stably produced. Therefore, the electrocatalyst for fuel cells of the present invention would be desirable for an automotive application. Further, more inexpensive and various fuels, which are difficult to reform, can be used for fuel cells.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An electrocatalyst for fuel cells having a carbon support body resistant to carbon monoxide poisoning, comprising a metal catalyst adsorbed on a surface of the support body, wherein the support body has a plurality of pores, penetrating into the interior thereof to form a porous support body, the metal catalyst being adsorbed and reduced onto an outer surface of the porous support body and an inner surface of the pores, the metal catalyst having a surface on which is adsorbed a polymer through which particles of the metal catalyst are connected, the pores after adsorption and reduction of the metal catalyst and adsorption of the polymer being in the range of from 2.8 Å to less than 3.8 Å in an average diameter of each pore entrance to restrict entrance of carbon monoxide.

2. The electrocatalyst for fuel cells having a support body resistant to carbon monoxide poisoning as defined in claim 1, wherein the total surface area of the porous support body is 200-2,500 $m^2/g$, including the outer surface of the porous support body and the inner surface of the pores penetrating into the interior of the support body.

3. The electrocatalyst for fuel cells having a support body resistant to carbon monoxide poisoning as defined in claim 1, wherein the total volume of the pores formed in the porous support body is 0.4-2.0 $m^3/g$.

4. The electrocatalyst for fuel cells having a support body resistant to carbon monoxide poisoning as defined in claim 1, wherein the pores formed in the porous support body comprise 50-80 vol % of mesopores and 20-50 vol % of micropores.

5. The electrocatalyst for fuel cells having a support body resistant to carbon monoxide poisoning as defined in claim 1, wherein the metal catalyst comprises a Pt-M alloy, in which M is a metal selected from the group consisting of Ru, Sn, Os, Rh, Ir, Pd, V, Cr, Co, Ni, Fe and Mn.

6. The electrocatalyst for fuel cells having a support body resistant to carbon monoxide poisoning as defined in claim 1, wherein the metal catalyst is used in an amount of 10-80 parts by weight, based on the total 100 parts by weight of the porous support body and the metal catalyst.

7. A method of making an electrocatalyst for fuel cells having a support body resistant to carbon monoxide poisoning, comprising: providing a metal catalyst; providing a polymer; providing a carbon support body, wherein the support body has a plurality of pores penetrating into the interior thereof to form a porous support body, the pores being 2-15 nm in an average diameter of each pore entrance; adsorbing the metal catalyst onto an outer surface of the porous support body and an inner surface of the pores; reducing the metal catalyst on the outer surface of the porous support body and the inner surface of the pores; adsorbing on a surface of the metal catalyst a polymer through which particles of the metal catalyst are connected; and forming pores after adsorption and reduction of the metal catalyst and adsorption of the polymer in the range of from 2.8 Å to less than 3.8 Å in an average diameter of each pore entrance to restrict entrance of carbon monoxide.

8. The method as defined in claim 7, wherein the total surface area of the porous support body is 200-2,500 $m^2/g$, including the outer surface of the porous support body and the inner surface of the pores penetrating into the interior of the support body.

9. The method as defined in claim 7, wherein the total volume of the pores formed in the porous support body is 0.4-2.0 $m^3/g$.

10. The method as defined in claim 7, wherein the pores formed in the porous support body comprise 50-80 vol % of mesopores and 20-50 vol % of micropores.

11. The method as defined in claim 7, wherein the metal catalyst comprises a Pt-M alloy, in which M is a metal selected from the group consisting of Ru, Sn, Os, Rh, Ir, Pd, V, Cr, Co, Ni, Fe and Mn.

12. The method as defined in claim 7, wherein the metal catalyst is used in an amount of 10-80 parts by weight, based on the total 100 parts by weight of the porous support body and the metal catalyst.

* * * * *